J. VALENTINE.
POWER TRANSMISSION MECHANISM.
APPLICATION FILED JAN. 6, 1913. RENEWED MAR. 19, 1915.
1,158,336.
Patented Oct. 26, 1915.
2 SHEETS—SHEET 1.
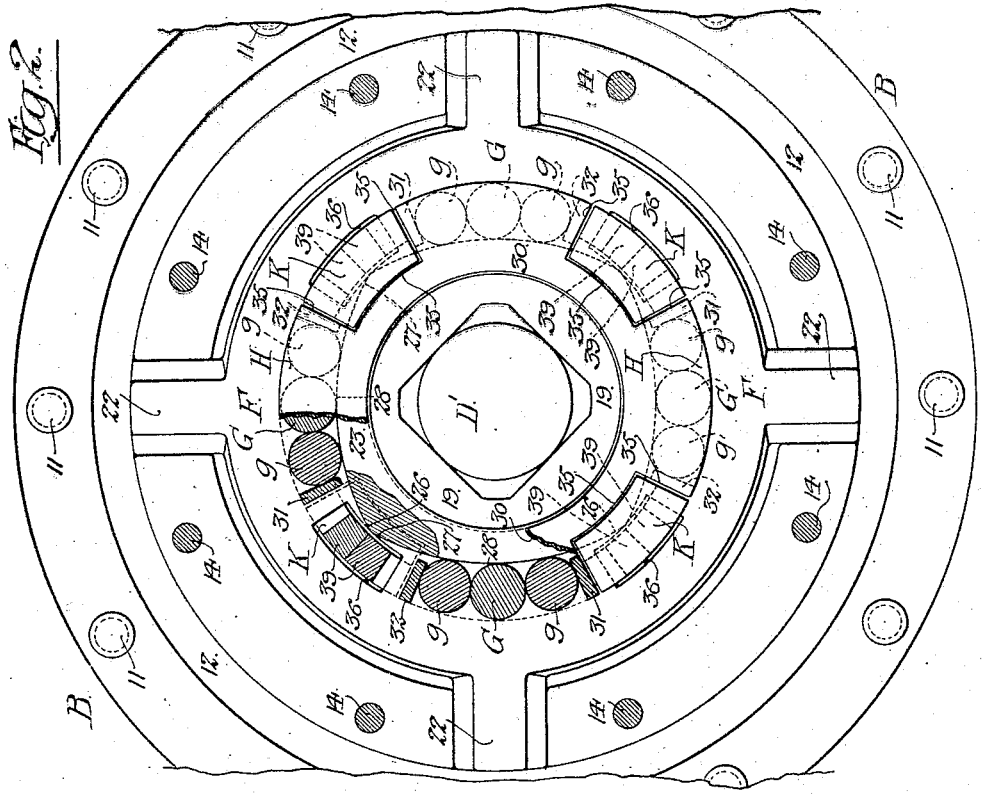
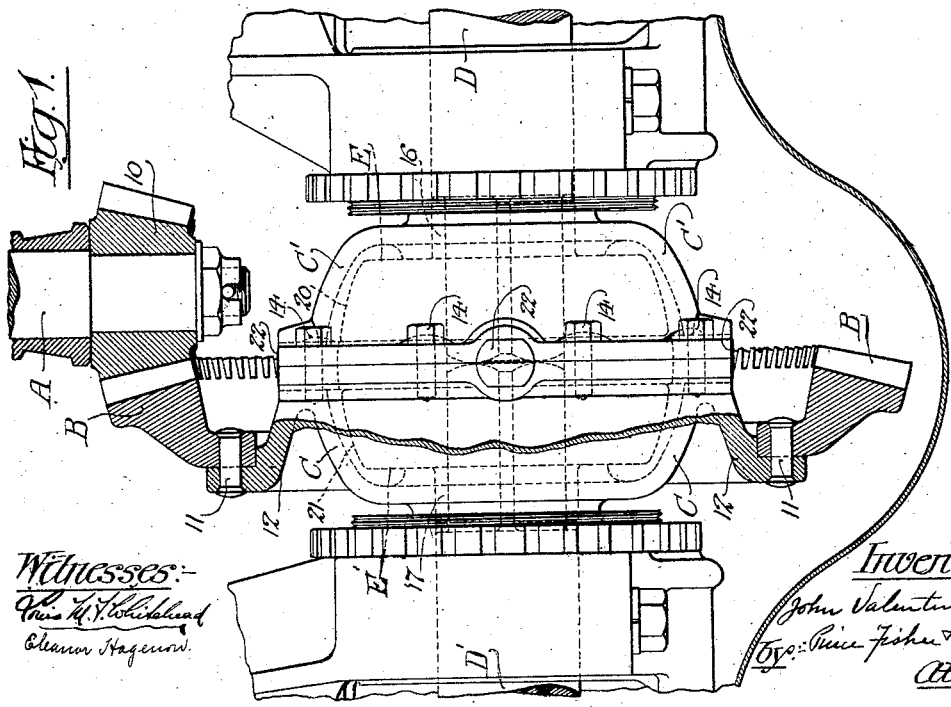

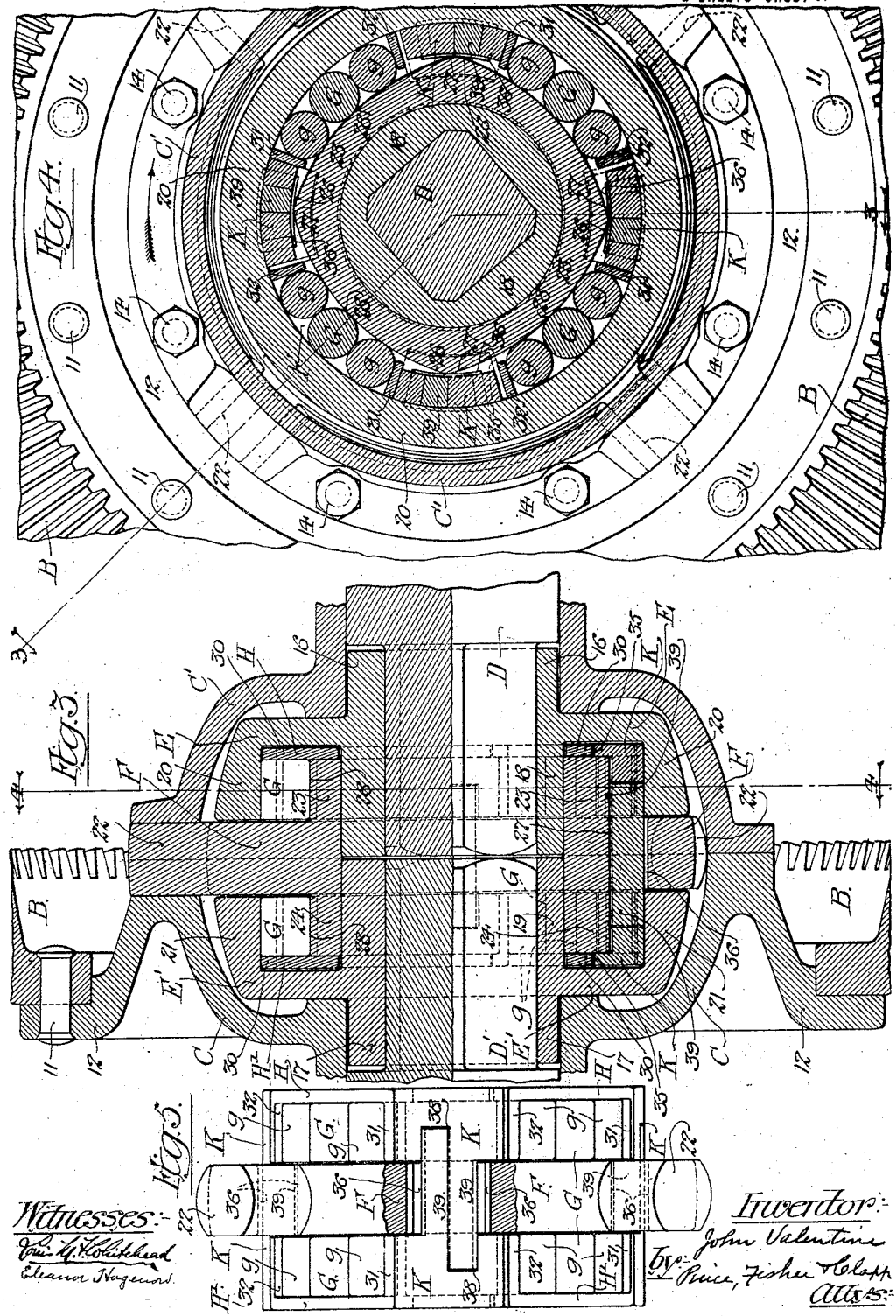

UNITED STATES PATENT OFFICE.

JOHN VALENTINE, OF CHICAGO, ILLINOIS.

POWER-TRANSMISSION MECHANISM.

1,158,336.  Specification of Letters Patent.  Patented Oct. 26, 1915.

Application filed January 6, 1913. Serial No. 740,321. Renewed March 19, 1915. Serial No. 15,579.

*To all whom it may concern:*

Be it known that I, JOHN VALENTINE, a citizen of the United States, and a resident of the city of Chicago, county of Cook, and State of Illinois, have invented certain new and useful Improvements in Power-Transmission Mechanism, of which I do declare the following to be a full, clear, and exact description, reference being had to the accompanying drawings, forming part of this specification.

My invention relates to that class of power transmission mechanism which, while susceptible of use in other situations, is especially adapted for use on power propelled vehicles; and more particularly, my invention relates to that class of power transmission mechanism in which the motion of the driving member is communicated to the driven members, that are united to the separate sections of the driven shaft, through the medium of a cam and friction rollers interposed between the faces of the cam and the driven members of the mechanism attached to the adjacent ends of the shaft sections.

The invention consists in the features of improvement hereinafter described, illustrated in the accompanying drawings, and more particularly pointed out in the claims at the end of this specification.

In the drawings I have shown portions only of the adjacent ends of the separate sections of the driven shaft (usually the rear axle) of a vehicle, and a portion only of the main driving shaft to which revolution will be imparted from a suitable engine.

Figure 1 is a plan view, the miter pinion on the drive shaft and the miter gear wheel of the transmission mechanism being shown in cross section. Fig. 2 is a view (upon a larger scale than Fig. 1) showing one-half of the casing that incloses the clutch mechanism removed, and showing certain parts in horizontal section. Fig. 3 is a view in section on lines 3—3 of Fig. 4. Fig. 4 is a view in cross section on line 4—4 of Fig. 3. Fig. 5 is a view in side elevation of the parts inclosed within the casing, portions being broken away for better illustration.

A designates the driving shaft, to the end of which is fixed the miter pinion 10 that meshes with a miter wheel B that is suitably bolted, as at 11, to a web 12 that projects outwardly from one section of the main inclosing casing of the apparatus. This casing is shown as consisting of two sections C and C' that are united together by bolts 14 passing through the flanged abutting portions of the casing sections. The sections C and C' of the main casing are formed with openings in their hubs through which pass the inner portions of the driven shaft sections D and D', and in the hubs of the sections C C' of the casing loosely fit the outwardly projecting portions 16 and 17 of the hubs 18 and 19 of the driven members E and E' between which hubs and the outer peripheral portions 20 and 21 of the driven members the cams, the rollers and the roller carriers are sustained. Each of the hubs of the driven members E and E' is formed with a polygonal opening (see Fig. 4) adapted to receive the correspondingly shaped reduced end of the shaft section D or D', so that movement imparted to each driven member E or E' is transmitted to its corresponding shaft section.

The inner portions 18 and 19 of the hubs of the driven members E and E' pass loosely through the hub of the central cam ring or driving member F. This cam ring F is held in fixed relation with respect to the casing C C' preferably by radial arms 22 that pass through seats formed in the flanged abutting edges of the sections C C' of the casing, as clearly shown in Figs. 1, 2 and 3. From the sides of the central cam ring F project the cams 23 and 24 and the periphery of each of these cams 23 and 24 is provided with a series of cam surfaces each having high portions 26 and 27 and intermediate lower portions 28, between which surfaces and the rings formed by the peripheral portions of the driven members E and E' are placed the rollers G and g.

In the accompanying drawings I have shown four groups or sets of rollers G and g, although I wish it understood that the number, character and arrangement of the rollers may be varied without departing from the spirit of the invention. In the preferred form of the invention, each group of rollers comprises a central roller G that is of slightly larger diameter than the rollers g on each side thereof, and the rollers are maintained in relative position by suitable carriers or guards H and H'. In the preferred embodiment of the invention, each of the roller carriers comprises a ring 30 having integral therewith inwardly projecting arms 31 and 32, between which arms the individual groups of rollers are carried. Each of the rings 30 of the roller carriers H and H' is formed with a series of segmental spaces 35 (see Fig. 2), and through these spaces pass the stops K that pass also through the slots 36 that are formed in the cam ring F, preferably at points immediately opposite the several high portions of the working faces of the cams. The segmental spaces 35 are longer than the stops K, so that the carriers are shiftable relatively to the stops, for a purpose to be presently stated. Preferably, each of the stops K is formed of two parts adapted to interlock. As shown, (see Figs. 2, 4 and 5), each stop K consists of a head portion formed with a recess 38 and with an inwardly projecting arm 39.

When the parts of the stops are to be assembled, the arms 39 will be passed in opposite direction through the slots 36 formed in the cam ring, as shown in Fig. 5, the free ends of the arm 39 of one part of the stop entering the recess 38 of the opposite part of the stop; and the heads of the stops will rest upon the opposite faces of the cam ring F, as these heads are slightly larger than the slots 36. It will be observed that when the stops are set in position, upon the cam ring, as indicated in Fig. 5, the slots 36, being longer than the width of the stops, will permit a slight longitudinal shift or movement of the stops with respect to the cam ring. This is an important feature, the advantage of which will presently more fully appear.

From the foregoing description it will be seen that the roller carriers on opposite sides of the cam ring are movable independently of each other, and this is a very important feature of my invention, as will presently appear. When the parts are assembled, as shown in the drawings, and are in the position represented in Fig. 2, the cams and rollers are in such position that none of the rollers are bound or wedged between the cams and the driven members and, hence, the driven members are free to run. This will be the relation of the parts, for instance, when the car is coasting with the driving shaft at rest. If, now, motion is imparted from the engine to the driving shaft and the gear wheel B to propel the car in forward direction, the cam ring F will be turned in the direction of the arrow (Fig. 4) and the cams 23 and 24 will be shifted from the position shown in Fig. 2, to the position shown in Fig. 4. As the cam ring is thus shifted, the frictional engagement of the roller carriers H and H' with the driven members E and E', and the "drag" or friction of the lubricant within the casing, will initially retard the movement of the roller carriers and rollers, with the result that the large central roller G of each group and the smaller roller g at the left-hand side thereof (Fig. 4) will be wedged between the part inclining toward the higher portion 26 of the corresponding cam surface of each cam and the opposite part of the driven member, while the roller g of each group at the right-hand of the central roller G will be free to revolve. As the cam ring F is thus initially moved, there will be a slight relative movement between the cam ring and the stops K, because of the lost motion connection between these parts due to the fact that the slots 36 of the cam ring are longer than those parts of the stops that pass through these slots. Consequently, as the cam ring is initially shifted, the stops K will be brought toward, or somewhat nearer, the left-hand end faces of the slots 36 of the cam ring, while a wider open space will occur between the right-hand end faces of the slots 36 and the adjacent portions of the stops K. It will be seen also that, because of the slight retarding of the roller carriers as the cam ring is initially shifted, the projecting arms 31 of each roller carrier H and H' will be brought against, or approximately against, the right-hand end of each of the stops K, while a slight space will be left between the left-hand ends of the stops and the adjacent arms 32 of the roller carriers. The parts will maintain this position so long as the car is running in straight direction with the wheels traveling at like speed. If, however, the car is turned to travel in curved direction, say toward the right, the left-hand or outer wheel and the corresponding left-hand driven member 21 attached to the inner end of the left-hand axle section will travel at a faster speed than the inner or right-hand driven member. Consequently, the left-hand driven member 21 will travel faster than the cam ring F. As the speed of the left-hand driven member is thus initially increased, the effect will be to release the grip or wedging action between the outer rim 21 of this driven member, and the rollers G and g, and this is permitted because, with my present invention, the roller carriers are movable independently of each other.

During the initial movement of the left-hand driven member at higher speed than that of the right-hand driven member, the roller carrier H' will be shifted slightly to bring its arms 32 against the stops K. These stops, therefore, serve to prevent any such movement toward the right, of the roller carrier H' and its groups of rollers, as would tend to wedge the large roller G and the smaller roller g at the right thereof, between the right-hand raised portion 27 of the cam 24 and the outer portion 21 of the left-hand driving member. When the driven members E and E' are thus traveling at different speeds, the stops K will be securely held in the position (indicated in Fig.

4) toward the left of the slots 36, because these stops will at such time bear against and be held by the arms 31 of the roller carrier within the driven member traveling at the slower speed. Hence, the roller carrier and the rollers of the faster traveling driven member will be arrested by the stops K before the rollers of such driven member can come into wedging engagement with the raised portion 27 of the opposing cam; and, therefore, the rollers within the faster moving driven member are free to revolve. It will be understood, of course, that when the car resumes travel in straight direction, the position of the parts at both sides of the cam ring will be as indicated in Fig. 4 of the drawings.

As the speed of the left-hand driven member slows down to the speed of the right-hand driven member, the frictional engagement between the left-hand driven member and the roller carrier H′ will retard the roller carrier H′ and the arms of this roller carrier will hold the several groups of rollers in proper relative position to permit the immediate engagement with the rollers of the several cam faces. Inasmuch as the roller carriers H and H′ are shiftable indecpendent of each other, I am enabled to closely assemble the rollers in each carrier so that the retarding or shifting of the roller carrier promptly and accurately brings its rollers into either wedging or free position. The rollers being thus compelled to follow with certainty the movements of the roller carriers, all danger of the uncertain action of the rollers incident to the movement independent of the carriers, is avoided.

It is manifest that the details of construction above set out may be varied within wide limits without departing from the spirit of the invention. Thus, for example, other suitable forms of carriers for the rollers might be employed, and, it is not essential that the carriers for the several groups of rollers should be connected together by the rings 30, although I prefer to so connect the carriers to the rings, or form the carriers as parts of the rings, to better insure their unison movement. It will be understood, of course, that the parts which effectively serve as carriers for the rollers are the inwardly projecting arms 31 and 32, united together by the portions of the rings 30 that extend between such arms and opposite the rollers. So, also, while I have illustrated my invention as applied to a driving member having a double cam connected therewith, features of the invention may be employed, even if a single cam and corresponding driven member were used. Obviously, the shape of the faces of the cams may be varied, although I prefer the construction shown in which each of the cams is formed with a plurality of wedging surfaces having reversely disposed faces. It will also be readily understood by those familiar with this class of devices, that features of the invention may be employed without its adoption as an entirety.

Having thus described my invention, what I claim as new, and desire to secure by Letters Patent, is:—

1. A power transmission mechanism comprising in combination, a driving member, a driven member, a cam connected to said driving member, rollers interposed between said cam and said driven member, a carrier for said rollers, and a stop movable with respect to said carrier and connected to said driving member for determining the movement of said rollers.

2. A power transmission mechanism comprising in combination, a driving member, a driven member, a cam connected to said driving member, rollers interposed between said carrier and said driven member, a carrier for said rollers, and a stop movable with respect to said carrier, said stop being shiftably connected to said driving member, for determining the movement of said rollers.

3. A power transmission mechanism comprising in combination, a driving member, two driven members, two cams connected to the driving member, rollers interposed between said cams and said driven members, carriers for said rollers, the carrier for the rollers engaged by one cam being movable independently of the carrier for the rollers engaged by the other cam, and stops connected to said driving member for determining the movement of said rollers.

4. A power transmission mechanism comprising in combination, a driving member, two driven members, two cams connected to the driving member, groups of rollers interposed between said cams and said driven members, carriers for the groups of rollers, the carrier for the rollers engaged by one cam being movable independently of the carrier for the rollers engaged by the other cam, and stops connected to said driving member by lost motion connection for determining the movement of said rollers.

5. A power transmission mechanism comprising in combination, a driving member, two driven members, cams located upon opposite sides of the driving member, rollers interposed between said cams and said driven members, suitable carriers for said rollers, the carrier for the rollers engaged by one cam being movable independently of the carrier for the rollers engaged by the other cam, and stops movable independently of the carriers, said stops being connected to the driving member.

6. A power transmission mechanism comprising in combination, a driving member, two driven members, cams located upon opposite sides of the driving member, rollers interposed between said cams and said driven members, suitable carriers for said rollers, the carrier for the rollers engaged by one cam being movable independently of the carrier for the rollers engaged by the other cam, and stops movable independently of the carriers, said stops extending between the two carriers and being loosely connected to the driving member.

7. A power transmission mechanism comprising in combination, a driving member, two driven members, two cams connected to the driving member, rollers interposed between said cams and said driving members, carriers for said rollers, the carrier for the rollers engaged by one cam being movable independently of the carrier for the rollers engaged by the other cam, and stops for determining the movement of said rollers, said stops being formed of interlocking sections.

8. A power transmission mechanism comprising in combination, a driving member having slots formed therein, two driven members, two cams connected to the driving member, rollers interposed between said cams and said driving members, carriers for said rollers, the carrier for the rollers engaged by one cam being movable independently of the carrier for the rollers engaged by the other cam, and stops passing through the slots of said driving members for determining the movement of said rollers.

9. A power transmission mechanism comprising in combination, a driving member, two driven members, two cams connected to the driven member, individual groups of rollers arranged opposite the faces of said cams, carriers for retaining the rollers of each group closely together, the carrier for the rollers engaged by one cam being movable independently of the carrier for the rollers engaged by the other cam, and stops movable with respect to said carriers and connected to the driving member.

10. A power transmission mechanism comprising in combination, a driving member, a driven member, a cam connected with said driving member, a group of rollers interposed between said cam and said driven member, said group comprising a centrally located roller of larger diameter than the rollers at the sides thereof, a carrier for said rollers, and means connected to said driving member for determining the movement of said rollers.

JOHN VALENTINE.

Witnesses:
GEORGE P. FISHER,
KATHARINE GERLACH.

Copies of this patent may be obtained for five cents each, by addressing the "Commissioner of Patents, Washington, D. C."